(12) United States Patent
Jin

(10) Patent No.: US 9,581,079 B2
(45) Date of Patent: Feb. 28, 2017

(54) TWO-STAGE TURBOCHARGER APPARATUS

(71) Applicant: Hyundai Motor Company, Seoul (KR)

(72) Inventor: Seok Beom Jin, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 112 days.

(21) Appl. No.: 14/718,269

(22) Filed: May 21, 2015

(65) Prior Publication Data

US 2016/0153405 A1    Jun. 2, 2016

(30) Foreign Application Priority Data

Dec. 1, 2014  (KR) .................. 10-2014-0169940

(51) Int. Cl.
| *F02B 37/013* | (2006.01) |
| *F02B 37/18*  | (2006.01) |
| *F02B 37/00*  | (2006.01) |
| *F02B 37/02*  | (2006.01) |

(52) U.S. Cl.
CPC .......... *F02B 37/183* (2013.01); *F02B 37/004* (2013.01); *F02B 37/013* (2013.01); *F02B 37/025* (2013.01); *F02M 26/08* (2016.02); *F02M 26/14* (2016.02)

(58) Field of Classification Search
CPC .... F02B 37/004; F02B 37/013; F02B 37/025; F02B 37/183; F02M 26/08; F02M 26/14
See application file for complete search history.

(56) References Cited

U.S. PATENT DOCUMENTS

| 4,730,456 A * | 3/1988 | Tadokoro ................ F01D 17/18 251/298 |
| 8,621,863 B2 * | 1/2014 | Kratschrner ............ F01D 9/026 415/151 |
| 2005/0081522 A1 | 4/2005 | Raab et al. |
| 2006/0137342 A1 | 6/2006 | Delavan et al. |
| 2009/0047121 A1 * | 2/2009 | Whiting .................. F01D 9/026 415/144 |
| 2011/0020108 A1 | 1/2011 | Axelsson et al. |
| 2011/0296835 A1 * | 12/2011 | Ebisu .................... F02B 37/025 60/611 |
| 2014/0298799 A1 * | 10/2014 | Wu ........................ F01N 13/10 60/602 |

FOREIGN PATENT DOCUMENTS

| JP | 5-69364 U | 9/1993 |
| JP | 2007-138845 A | 6/2007 |
| KR | 10-2011-0115580 A | 10/2011 |

* cited by examiner

*Primary Examiner* — Audrey K Bradley
(74) *Attorney, Agent, or Firm* — McDermott Will & Emery LLP

(57) ABSTRACT

A two-stage turbocharger apparatus includes first and second passages having different cross-sectional areas. The first and second passages are connected to an inlet end of a high-pressure turbine and are configured to supply exhaust gas discharged from an exhaust manifold of an engine to the inlet end of the high-pressure turbine. Third and fourth passages, having different cross-sectional areas, connect an outlet end of the high-pressure turbine to an inlet end of a low-pressure turbine. An EGR valve has one end connected to one of the first and second passages. A bypass line has a first end connected to the other of the first and second passages and a second end connected to one of the third and fourth passages.

5 Claims, 2 Drawing Sheets

TWO-STAGE TURBOCHARGER APPARATUS

CROSS-REFERENCE(S) TO RELATED APPLICATIONS

The present application claims priority to Korean Patent Application No. 10-2014-0169940, filed Dec. 1, 2014, the entire contents of which is incorporated herein for all purposes by this reference.

TECHNICAL FIELD

Exemplary embodiments of the present inventive concept relate to a two-stage turbocharger apparatus in which high and low pressure turbines are arranged in series.

BACKGROUND

A conventional two-stage turbocharger apparatus compresses intake air twice and supplies the compressed intake air to a combustion chamber of an engine, thereby enabling power of the engine to be increased. In addition, it may be possible to minimize an energy loss of exhaust gas by maximizing efficiency of the two-stage turbocharger apparatus through high and low pressure turbochargers connected in series.

FIG. 1 is a diagram illustrating a structure of a typical two-stage turbocharger apparatus of an engine. Referring to FIG. 1, the two-stage turbocharger apparatus includes a high-pressure side turbo device 12 connected to an exhaust manifold 11a and an intake manifold 11b of an engine 11, and a low-pressure side turbo device 13 connected in series thereto.

In addition, a high-pressure turbine TB1 of the high-pressure side turbo device 12 and a low-pressure turbine TB2 of the low-pressure side turbo device 13 rotate using flow energy of exhaust gas discharged from the exhaust manifold 11a of the engine 11. Through such a configuration, air is primarily pressurized by a low-pressure compressor CP2 of the low-pressure side turbo device 13 and the air is secondarily pressurized by a high-pressure compressor CP1 of the high-pressure side turbo device 12, so that the pressurized air is supplied to the intake manifold 11b of the engine through an intercooler 14.

When the engine 11 is driven at high speed, the amount of exhaust gas taken in by the high-pressure side turbo device 12 is insufficient compared to an amount of exhaust gas discharged from the exhaust manifold 11a. For this reason, a waste gate valve WG mounted to the high-pressure turbine TB1 is opened such that exhaust gas is bypassed.

When an Exhaust Gas Recirculation (EGR) valve 15 is opened, the exhaust gas recirculated by the EGR valve 15 is cooled through an EGR cooler.

In this case, there is however a problem in that performance of the two-stage turbocharger apparatus may not be maximized under some operating conditions such as high EGR rate since pressure decrease occurs at an inlet of the high-pressure turbine TB1 when the EGR valve 15 is opened and the volume of a passage connected to the low-pressure turbine TB2 is increased when the waste gate valve WG is also opened.

In particular, when the EGR valve 15 is widely opened, the efficiency of the high-pressure turbine TB1 may be decreased due to flow separation at the inlet end of the high-pressure turbine TB1. For this reason, the efficiency of the two-stage turbocharger apparatus may be reduced since a boost pressure rising rate is decreased when a vehicle is accelerated.

The matters described as the related art have been provided only for assisting the understanding for the background of the present inventive concept and should not be considered as corresponding to the related art already known to those skilled in the art.

SUMMARY

Objects and advantages of the present inventive concept can be understood by the following description, and become apparent with reference to the embodiments of the present inventive concept. In accordance with an embodiment of the present inventive concept, a two-stage turbocharger apparatus includes first and second passages having different cross-sectional areas, the first and second passages connected to an inlet end of a high-pressure turbine and configured to supply exhaust gas discharged from an exhaust manifold of an engine to the inlet end of the high-pressure turbine, third and fourth passages having different cross-sectional areas, the third and fourth passages connecting an outlet end of the high-pressure turbine to an inlet end of a low-pressure turbine. An EGR valve has one end connected to one of the first and second passages, and a bypass line has a first end connected to the other of the first and second passages. A second end of the bypass line is connected to one of the third and fourth passages.

In certain embodiments, the first passage may have a smaller cross-sectional area than the second passage, and the third passage may have a smaller cross-sectional area than the fourth passage.

In certain embodiments, the EGR valve may be connected to the first passage.

In certain embodiments, the first end of the bypass line may be connected to the second passage and the second end of the bypass line may be connected to the third passage.

In certain embodiments, the bypass line may include a waste gate valve.

DETAILED DESCRIPTION

Figure 1:
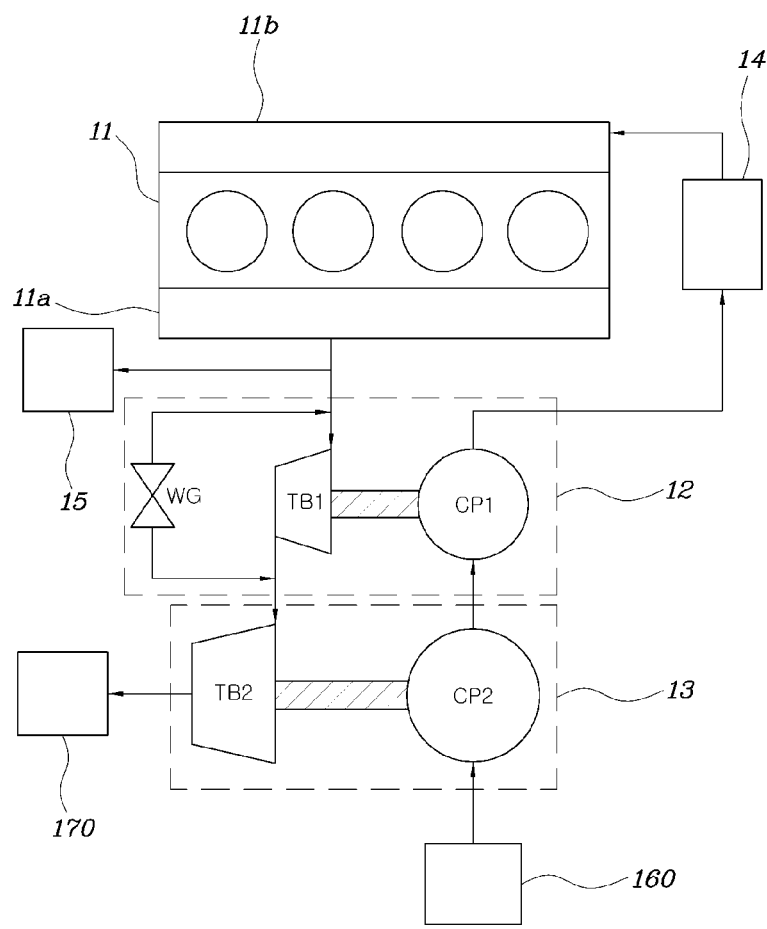
FIG. 1 is a diagram illustrating a structure of a typical two-stage turbocharger apparatus of an engine.

Exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. Throughout the disclosure, like reference numerals refer to like parts throughout the various figures and embodiments of the present inventive concept.

Figure 2:
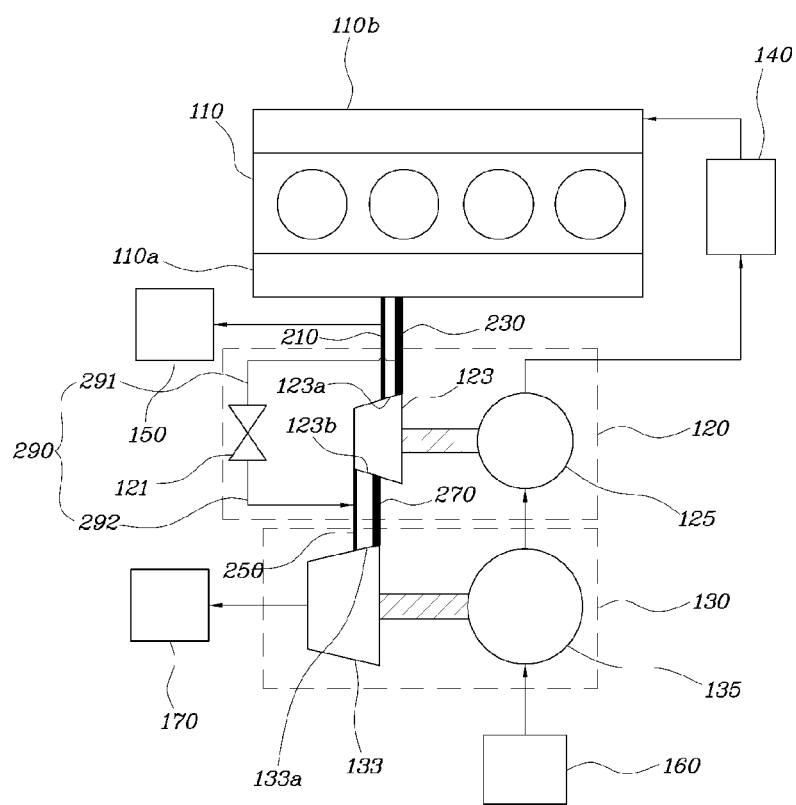
FIG. 2 is a diagram illustrating a structure of a two-stage turbocharger apparatus according to an embodiment of the present inventive concept.

Hereinafter, a two-stage turbocharger apparatus according to an exemplary embodiment of the present inventive concept will be described with reference to the accompanying drawings. FIG. 2 is a diagram illustrating a structure of the two-stage turbocharger apparatus according to the embodiment of the present inventive concept, in which a numeral 120 indicates a high-pressure side turbo device, a numeral 130 indicates a low-pressure side turbo device, a numeral 125 indicates a high pressure compressor, a numeral 135 indicates a low pressure compressor, a numeral 140 indicates a intercooler. And, in FIGS. 1 and 2, a numeral 160 indicates air cleaner and a numeral 170 indicates an aftertreatment device.

Referring to FIG. 2, the two-stage turbocharger apparatus may include first and second passages 210 and 230, having different cross-sectional areas, which are connected to an inlet end 123*a* of a high-pressure turbine 123 for supplying exhaust gas discharged from an exhaust manifold 110*a* of an engine 110 to the inlet end 123*a* of the high-pressure turbine 123, third and fourth passages 250 and 270, having different cross-sectional areas, which are connecting an outlet end 123*b* of the high-pressure turbine 123 to an inlet end 133*a* of a low-pressure turbine 133, an EGR valve 150 one end of which is connected to one of the first and second passages 210 and 230, and a bypass line 290 configured such that a first end 291 of the bypass line 290 is connected to the other of the first and second passages 210 and 230 (which, in certain embodiments, is not connected to the EGR valve 150), and a second end 292 of the bypass line 290 is connected to one of the third and fourth passages 250 and 270.

In certain embodiments, the first passage 210 may have a smaller cross-sectional area than the second passage 230, and the third passage 250 has a smaller cross-sectional area than the fourth passage 270.

In general, the engine 110 is classified into a four-cylinder engine or a six-cylinder engine according to the number of cylinders. In the engine 110, exhaust gas discharged from a plurality of cylinders is collected in the exhaust manifold 110*a* and then supplied to the high-pressure turbine 123 through the first and second passages 210 and 230. In this case, one half of the plurality of cylinders may discharge the exhaust gas to the inlet 123*a* end of the high-pressure turbine 123 through the first passage 210 and the other half thereof may discharge the exhaust gas to the inlet 123*a* end of the high-pressure turbine 123 through the second passage 230.

In the present inventive concept, the EGR valve 150 may be connected to the first passage 210.

In the related art, exhaust gas discharged from cylinders is collected in an exhaust manifold 11*a* and then supplied to a high-pressure turbine TB1 through one passage. For this reason, when an EGR valve 15 is opened, the exhaust gas to be supplied to an inlet end of the high-pressure turbine TB1 is discharged in quantities through the EGR valve 15, thereby causing pressure decrease at the inlet end of the high-pressure turbine TB1.

On the other hand, an embodiment of the present inventive concept is configured such that the exhaust gas discharged from the exhaust manifold 110*a* is supplied to the inlet end 123*a* of the high-pressure turbine 123 through the first and second passages 210 and 230 and the EGR valve 150 is connected only to the first passage 210 having a relatively smaller cross-sectional area than the second passage 230. Consequently, it may be possible to reduce a pressure loss at the inlet end 123*a* of the high-pressure turbine 123 caused by opening of the EGR valve 150.

In the related art, when a waste gate valve WG is opened (FIG. 1), exhaust air discharged through the exhaust manifold 11*a* is bypassed through a bypass line to be supplied to a low-pressure turbine TB2. In this case, there is a problem in that performance of a two-stage turbocharger is deteriorated since a passage connected to an inlet end of the low-pressure turbine TB2 inevitably has a long length.

On the other hand, in an embodiment of the present inventive concept, the first end 291 of the bypass line 290 is connected to the second passage 230 while the second end 292 thereof is connected to the third passage 250, and the bypass line 290 includes a waste gate valve 121.

For example, in certain embodiments, when the both of the EGR valve 150 and the waste gate valve 121 are opened, the exhaust gas supplied to the high-pressure turbine 123 through the second passage 230 is fully supplied to the bypass line 290.

Thus, since the exhaust gas is supplied toward the third passage 250 having a relatively smaller cross-sectional area than the second passage 230, the flow rate of the exhaust gas is increased. That is, since the exhaust gas is rapidly supplied to the inlet end 133*a* of the low-pressure turbine 133, it may be possible to reduce a loss of the exhaust gas at the low-pressure turbine 133 due to the bypass passage, compared to the related art.

In addition, exhaust gas discharged from the outlet 123*b* end of the high-pressure turbine 123 through the fourth passage 270 is directly supplied to the inlet end 133*a* of the low-pressure turbine 133. Therefore, exhaust gas which is not bypassed to the low-pressure turbine 133 may also be effectively supplied to the low-pressure turbine 133.

Accordingly, since the passages having different cross-sectional areas are applied between the exhaust manifold 110*a* and the high-pressure turbine 123 and between the high-pressure turbine 123 and the low-pressure turbine 133, the two-stage turbocharger apparatus may have improved transient performance.

In the two-stage turbocharger apparatus of the above-described embodiments, since the exhaust manifold and the inlet end of the high-pressure turbine are interconnected by the plurality of passages, the pressure loss at the inlet end of the high-pressure turbine may be decreased even though the EGR valve is opened.

In addition, it may be possible to balance performance deterioration of the turbocharger apparatus by increase in flow rate according to reduction in cross-sectional areas of the passages even though both of the EGR valve and the waste gate valve are opened, and thus to increase responsiveness to the low-pressure turbine.

In addition, it may be possible to balance performance deterioration of the turbocharger apparatus by increase in flow rate according to reduction in cross-sectional areas of the passages even though both EGR valve and waste gate valve are opened, and thus to increase responsiveness to a low-pressure turbine.

While the present inventive concept has been described with respect to the specific embodiments, it will be apparent to those skilled in the art that various changes and modifications may be made without departing from the spirit and scope of the inventive concept as defined in the following claims.

What is claimed is:
1. A two-stage turbocharger apparatus comprising:
   first and second passages having different cross-sectional areas, the first and second passages connected to an inlet end of a high-pressure turbine and configured to supply exhaust gas discharged from an exhaust manifold of an engine to the inlet end of the high-pressure turbine;

third and fourth passages having different cross-sectional areas, the third and fourth passages connecting an outlet end of the high-pressure turbine to an inlet end of a low-pressure turbine;

an Exhaust Gas Recirculation (EGR) valve, one end of which is connected to one of the first and second passages; and a bypass line having a first end connected to the other of the first and second passages, and a second end connected to one of the third and fourth passages.

2. The two-stage turbocharger apparatus of claim 1, wherein the first passage has a smaller cross-sectional area than the second passage, and the third passage has a smaller cross-sectional area than the fourth passage.

3. The two-stage turbocharger apparatus of claim 2, wherein the EGR valve is connected to the first passage.

4. The two-stage turbocharger apparatus of claim 2, wherein the first end of the bypass line is connected to the second passage and the second end of the bypass line is connected to the third passage.

5. The two-stage turbocharger apparatus of claim 4, wherein the bypass line comprises a waste gate valve.

\* \* \* \* \*